United States Patent
Noble, Jr. et al.

(10) Patent No.: US 9,813,559 B1
(45) Date of Patent: *Nov. 7, 2017

(54) ADDRESSING TRUNK-RELATED RESOURCE DEFICIENCIES FOR A PREDICTIVE DIALER USING A DYNAMIC PACING ALGORITHM

(71) Applicant: Noble Systems Corporation, Atlanta, GA (US)

(72) Inventors: James K. Noble, Jr., Marietta, GA (US); Christopher S. Haggerty, Atlanta, GA (US)

(73) Assignee: Noble Systems Corporation, Atlanta, GA (US)

( * ) Notice: Subject to any disclaimer, the term of this patent is extended or adjusted under 35 U.S.C. 154(b) by 80 days.

This patent is subject to a terminal disclaimer.

(21) Appl. No.: 14/277,340

(22) Filed: May 14, 2014

Related U.S. Application Data

(63) Continuation-in-part of application No. 14/170,173, filed on Feb. 3, 2014, now Pat. No. 8,811,581, which is a continuation of application No. 13/534,130, filed on Jun. 27, 2012, now Pat. No. 8,675,839.

(51) Int. Cl.
*H04M 3/523* (2006.01)
*H04M 3/51* (2006.01)

(52) U.S. Cl.
CPC ....... *H04M 3/5238* (2013.01); *H04M 3/5158* (2013.01); *H04M 3/5175* (2013.01)

(58) Field of Classification Search
CPC . H04M 15/58; H04M 2203/1008; H04M 3/36
USPC .......................... 379/221.03, 266.08, 112.08
See application file for complete search history.

(56) References Cited

U.S. PATENT DOCUMENTS

| | | | |
|---|---|---|---|
| 4,829,563 A | 5/1989 | Crockett et al. |
| 4,881,261 A | 11/1989 | Oliphant et al. |
| 5,179,589 A | 1/1993 | Syu |
| 5,247,569 A | 9/1993 | Cave |

(Continued)

FOREIGN PATENT DOCUMENTS

WO  WO2003028356  4/2003

OTHER PUBLICATIONS

Alston Tascom, Inc., "Evolution Outbound Dialing," 13512 Vintage Pl, Chino, CA 91710, website: www.alstontascom.com. (2 pages), May 11, 2005.

*Primary Examiner* — Rasha Al Aubaidi
*Assistant Examiner* — Jirapon Intavong

(57) ABSTRACT

A predictive dialer in a call center may originate a number of outbound calls on behalf of agents for an outbound call campaign. Since many calls may fail to connect with the right party, the predictive dialer may originate several contemporaneous calls in order to provide a single call to an available agent. A pacing algorithm in the predictive dialer determines how many calls are to be made based on various factors, conditions, and rules. In some instances, the predictive dialer may attempt to originate more calls than there are available trunks. In such instances, the number of originated calls is limited by the number of available trunks causing a trunk-related deficiency condition, which can adversely impact the agents' performance. Various embodiments of the invention detect such conditions and address them to attempt to minimize current and future trunk-related deficiency conditions.

23 Claims, 7 Drawing Sheets

(56) References Cited

U.S. PATENT DOCUMENTS

| | | | |
|---|---|---|---|
| 5,299,260 | A | 3/1994 | Shaio |
| 5,327,490 | A | 7/1994 | Cave |
| 5,327,491 | A | 7/1994 | Syu |
| 5,371,787 | A | 12/1994 | Hamilton |
| 5,425,093 | A | 6/1995 | Trefzger |
| 5,436,965 | A | 7/1995 | Grossman et al. |
| 5,544,220 | A | 8/1996 | Trefzger |
| 5,546,456 | A | 8/1996 | Vilsoet et al. |
| 5,553,133 | A | 9/1996 | Perkins |
| 5,570,419 | A | 10/1996 | Cave et al. |
| 5,640,445 | A | 6/1997 | David |
| 5,822,400 | A | 10/1998 | Smith |
| 5,828,731 | A | 10/1998 | Szlam et al. |
| 5,889,799 | A * | 3/1999 | Grossman et al. ...... 379/266.08 |
| 5,907,601 | A | 5/1999 | David et al. |
| 5,991,393 | A | 11/1999 | Kamen |
| 6,170,011 | B1 | 1/2001 | Macleod Beck et al. |
| 6,226,360 | B1 | 5/2001 | Goldberg et al. |
| 6,278,776 | B1 * | 8/2001 | Mark ................. H04M 3/5158 379/266.08 |
| 6,466,664 | B1 | 10/2002 | Zhao |
| 6,636,486 | B1 | 10/2003 | Magloughlin |
| 6,707,906 | B1 | 3/2004 | Ben-Chanoch |
| 6,744,881 | B1 | 6/2004 | Price |
| 6,748,074 | B2 | 6/2004 | Khan |
| 6,754,236 | B1 | 6/2004 | Strandberg |
| 6,766,012 | B1 | 7/2004 | Crossley |
| 6,775,378 | B1 * | 8/2004 | Villena et al. ........... 379/266.07 |
| 6,804,346 | B1 | 10/2004 | Mewhinney |
| 7,010,115 | B2 | 3/2006 | Dezonno et al. |
| 7,106,851 | B2 | 9/2006 | Tang et al. |
| 7,386,850 | B2 | 6/2008 | Mullen |
| 8,126,133 | B1 | 2/2012 | Everingham et al. |
| 2003/0185378 | A1 | 10/2003 | Mullen |
| 2004/0133434 | A1 | 7/2004 | Szlam et al. |
| 2004/0170258 | A1 | 9/2004 | Levin et al. |
| 2005/0002515 | A1 | 1/2005 | Mewhinney et al. |
| 2005/0043986 | A1 | 2/2005 | McConnell et al. |
| 2006/0143617 | A1 * | 6/2006 | Knauerhase et al. ......... 718/104 |
| 2010/0002863 | A1 | 1/2010 | Loftus et al. |
| 2010/0086120 | A1 | 4/2010 | Brussat et al. |
| 2010/0135470 | A1 * | 6/2010 | Bishop ........................ 379/32.01 |
| 2010/0266116 | A1 | 10/2010 | Stolyar et al. |
| 2010/0303225 | A1 | 12/2010 | Shashkov et al. |
| 2014/0258446 | A1 * | 9/2014 | Bursell ........................ 709/217 |

* cited by examiner

ADDRESSING TRUNK-RELATED RESOURCE DEFICIENCIES FOR A PREDICTIVE DIALER USING A DYNAMIC PACING ALGORITHM

CROSS REFERENCE TO RELATED APPLICATIONS

This application is a continuation-in-part of U.S. patent application Ser. No. 14/170,713, entitled Reporting Unavailable Trunk-Related Resources for a Predictive Dialer Using a Dynamic Pacing Algorithm, filed on Feb. 3, 2014, which is a continuation of U.S. patent application Ser. No. 13/534,130, now U.S. Pat. No. 8,675,839 and entitled Reporting Unavailable Trunk-Related Resources for a Predictive Dialer Using a Dynamic Pacing Algorithm, filed on Jun. 27, 2012, the contents of both of which are incorporated by reference for all that they teach.

BACKGROUND

Call centers may originate outbound calls for various purposes. In one common application, a call center may originate telemarketing calls to individuals identified in a list of telephone numbers. In other applications, an inbound call center may take messages from inbound callers to arrange for more convenient times to call back the callers. These callback calls originate from the call center as outbound calls at the scheduled time and may also be defined in a list.

To efficiently dial outbound calls, call centers may employ various forms of automated dialing equipment. One such dialing equipment is a "progressive" or "preview" dialer. A progressive dialer presents call information to an agent on their workstation for a fixed amount of time before initiating a call. The progressive dialer ensures that an agent is available for handling the call before the call is initiated. However, in many instances, the call is unanswered or the call may reach an answering machine. There are other reasons why a call may not result in a connection with the right party (a.k.a. a "right party connect" or "RPC"). Regardless of the reason why a RPC does not occur, the end result is a reduction in the agent's productivity due to waiting for serially placed calls to encounter a RPC. As can be expected, the likelihood of a RPC can decrease during certain times of day and the agent may be unproductive for periods of time as the progressive dialer places calls.

Call centers may ameliorate this problem by using a predictive dialer. In one form, a predictive dialer initiates multiple calls for an agent, or a group of agents, often in expectation that an agent will be available to handle the call once a RPC is obtained. A predictive dialer is based on the probability that some of the initiated calls will not connect to the right party and that one of the agents will be available when a connected call does occur. A predictive dialer may originate calls for a single agent, but is frequently used for a group of agents. When the predictive dialer is operating with a group of agents, the predictive dialer can more accurately statistically predict when an agent is available for an outbound call.

The predictive dialer employs an algorithm for determining when and how many outbound calls should be originated. The algorithm for originating outbound calls cannot be so slow that agents are waiting to be connected to a call, but cannot be so fast that agents are unavailable when an outbound call is connected to the right party. This algorithm is often called a "pacing" algorithm and may employ various techniques to determine the optimal pacing of outbound call origination and the number of calls to originate under the current circumstances. A common attribute of pacing algorithms is that more calls may be originated than there are available agents, since it is expected that a certain percentage of outbound calls will achieve a RPC, and that some number of agents previously unavailable will become available to handle calls in the immediate future. It is with respect to these and other considerations that the disclosure herein is presented.

BRIEF SUMMARY

Technologies are generally presented herein pertaining to providing information regarding unavailable trunk-related resources when using a predictive dialer, which may use a dynamic pacing algorithm. Information of a trunk-related resource deficiency condition encountered by the predictive dialer may be indicated in various forms, including a real-time dashboard notification, such as an icon, or by providing a trunk-related resource deficiency report to a call center administrator. This information can comprise an indication of how many trunk-related resources, such as trunks, were optimally required by the predictive dialer as opposed to how many trunk-related resources were actually available. Information regarding a deficiency of trunk-related resources can be used by a call center administrator to more effectively utilize agent resources and/or address current and future deficiency conditions.

The subject matter disclosed herein may be implemented in various forms, including as a computer-controlled apparatus, a method, a computing system, or as an article of manufacture such as a computer readable storage medium. These and various other features will be apparent from the following description and associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
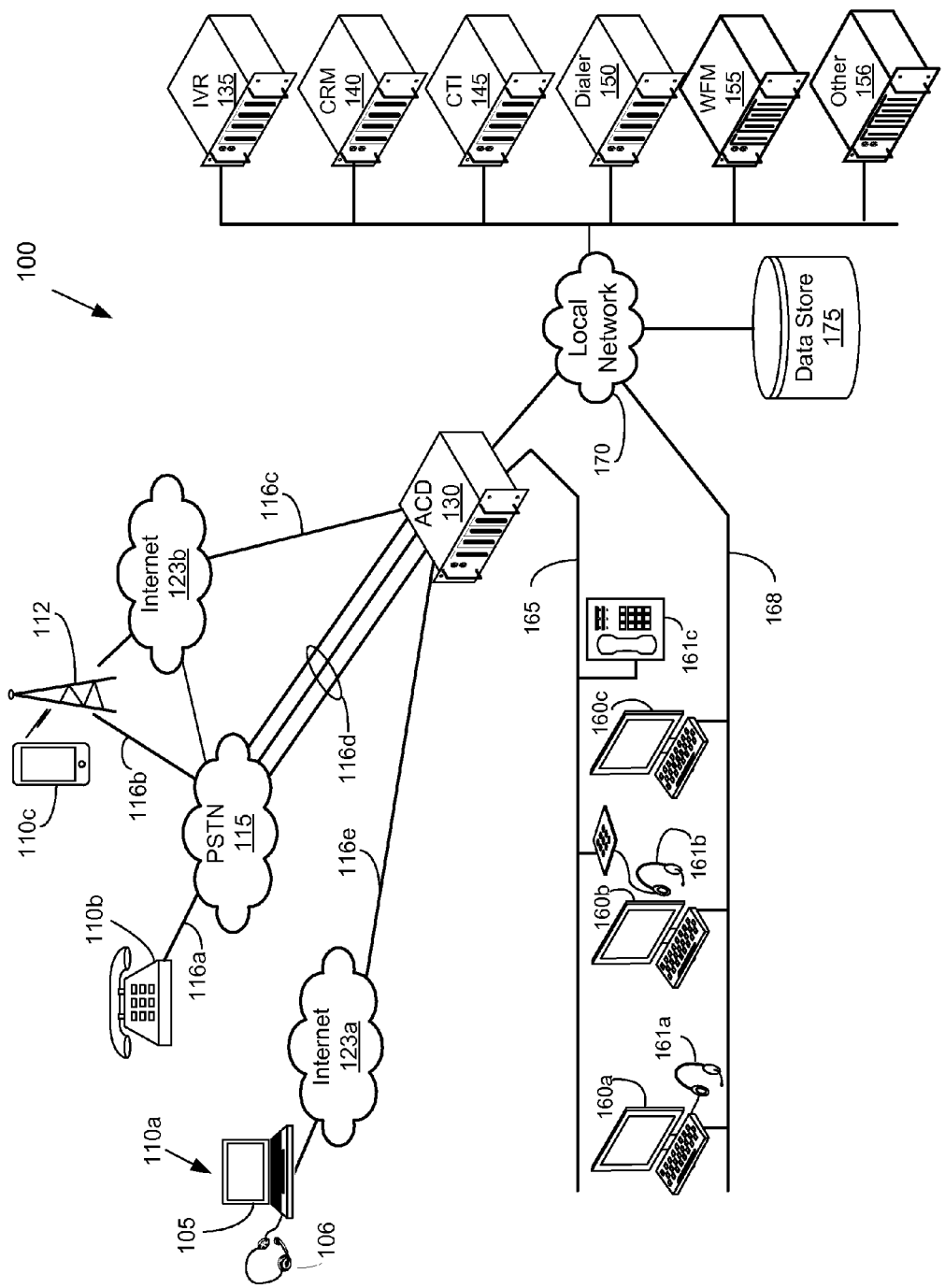
FIG. 1 shows one embodiment of a call center architecture illustrating the various technologies disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Exemplary Call Center Architecture

FIG. 1 shows one embodiment of a call center architecture 100 illustrating the various technologies disclosed herein. The call center shown in FIG. 1 may process voice calls that are inbound-only, outbound-only, or a combination of both (sometimes referred to as a "blended" call center). Although many aspects of call center operation are disclosed in the context of voice calls, in various embodiments, the call center may process other forms of communication such as, for example, facsimiles, emails, text messages, video calls, and chat messages. Since the call center may handle calls originating from a calling party, or initiated to a called party, the term "party," without any further qualification, refers to a person associated with a call processed by the call center, where the call is either received from or placed to the party. The term "caller," if used, will generally refer to a party communicating with the call center, but in many cases this usage is exemplary. Thus, use of the term "caller" is not intended to limit the concepts to only inbound calls or voice calls, unless the context dictates such. Specifically, a "caller" may originate calls that are voice calls or text calls.

Depending on the embodiment, inbound voice calls may originate from calling parties using a variety of different phone types. For instance, a calling party may originate a call from a conventional analog telephone 110b connected to a public switched telephone network ("PSTN") 115 using an analog plain old telephone service ("POTS") line 116a. The calls may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of the calls.

Inbound voice calls may also originate from a smart phone device 110c, such as a smart phone, tablet, or other smart device, which wirelessly communicates with a mobile service provider ("MSP") 112. The voice calls may be routed to the PSTN 115 using an integrated services digital network ("ISDN") interface 116b or other types of interfaces that are well known to those skilled in the art. In particular embodiments, the MSP 112 may also route calls as packetized voice, referred to herein as voice-over-IP ("VoIP") to an Internet provider 123b using Internet-based protocols. For convenience, unless indicated otherwise, the term "trunk" refers to any type of facility 116c, 116d, or 116e providing voice calls to, or from, the call center, regardless of the type of protocol or technology used. Specifically, a "trunk" is not limited to time-division multiplexing ("TDM") technology.

Inbound voice calls may also originate from a calling party employing a so-called "IP phone," "VoIP phone," or "soft phone" 110a. In one embodiment, this device may comprise a computing device 105, such as a laptop, computing tablet, or other electronic device, which interfaces with a headphone/microphone combination, also referred to as a "headset" 106. An IP phone may use a digital voice control protocol and may process packetized voice data according to various Internet based voice protocols, such as session initiated protocol ("SIP"). The call may be conveyed by other types of Internet providers 123a, such as a cable company providing Internet access services over a coaxial cable facility 116e. Those skilled in the art will recognize that a variety of protocols and facilities may be used to convey voice calls.

The term "telephone call" as used herein is generally synonymous with a "voice call" unless indicated otherwise. Further, the term "telephone call" may encompass a voice call originating from any type of device, such as a soft phone 110a, conventional telephone, 110b, a smart phone 110c, or other device known in the art. The term "call" as used herein may mean an active instance of two-way communication, an attempt to establish two-way communication, or a portion of the two-way communication. For example, a user at a conventional telephone 110b can dial a telephone call in an attempt to establish two-way communication, and a call can be said to exist even prior to establishment of a two-way connection. In another example, a call may be put on hold, and a portion of the call may be referred to as a "call leg" existing between the caller and certain equipment. A call may comprise a number of concatenated call legs, as known to those skilled in the art. In certain contexts, which will be made explicit, the call may encompass communications other than voice, for example, text, video chat, etc.

In various embodiments, inbound calls from callers to the call center may be received at an automatic call distributor ("ACD") 130. In particular embodiments, the ACD 130 may be a specialized switch for receiving and routing inbound calls under various conditions. Further, the ACD 130 may be embodied as a dedicated form of equipment readily available from various manufacturers, or the ACD 130 may be a so-called "soft switch" comprising a suitable programming module executed by a processing device to perform the necessary functions. The ACD 130 may route an incoming call over call center facilities 165 to an available agent. Depending on the embodiment, the facilities 165 may be any suitable technology for conveying the call, including but not limited to a local area network ("LAN"), wide area network ("WAN"), ISDN, or conventional TDM circuits. In addition, the facilities 165 may be the same or different from the facilities used to transport the call to the ACD 130.

In various embodiments, calls may be routed over facilities 165 to an agent for servicing. That is, for example, the party may speak with an agent to receive customer service. The physical area at which the agent sits is often referred to as an agent "position" and these positions are often grouped into clusters managed by a supervisor, who may monitor calls and the agents' productivity. An agent typically uses a computing device 160a-160b, such as a computer, and a voice device 161a-161c. The combination of computing device 160a-160c and voice device 161a-161c may be referred to as a "workstation." Thus, for these particular embodiments, the workstation collectively has a data capability and a voice capability, although separate devices may be used. In some instances, "workstation" may be used in reference to either the data or voice capability at the agent's position. For example, "routing the call to the agent's workstation" means routing a call to one of the voice devices 161a-161c at the agent's position. Similarly, "routing the call to the agent" means routing a call to the appropriate equipment at an agent's position.

In particular embodiments, the voice device 161a-161c used by an agent may be a soft phone device exemplified by a headset 161a connected to the computer 160a. The soft phone device may be a virtual telephone implemented in part by an application program executing on the computer 160a. Further, the phone may also comprise an Internet Protocol ("IP") based headset 161b or a conventional phone 161c. Use of the term "phone" is intended to encompass all these types of voice devices used by an agent, unless indicated otherwise.

Agents typically log onto their workstations prior to handling calls. This allows the call center to know which agents are available for handling calls. In particular embodiments, the ACD 130 may also maintain data of an agent's skill level that may be used to route a specific call to the agent or group of agents having the same skill level. In particular instances, if a suitable agent is not available to handle a call, the ACD 130 may queue the call for the next available agent. As can be expected, various algorithms may be employed to process calls in an efficient manner.

In various embodiments, two types of signaling information may be provided with an inbound call that may be used by the ACD 130 in processing the call. The first type of signaling information indicates the telephone number dialed by the caller, and is frequently referred to as "DNIS," derived from the Dialed Number Identification Service associated with this capability. For example, in particular instances, a call center may provide various services, such as sales, customer service, technical support, etc., each of which may be associated with a different telephone number (e.g., multiple toll free "800" numbers). In these instances, the ACD 130 may use the DNIS to determine the purpose of the call, and potentially identify a group of agents having the appropriate skill level to handle the call. Thus, in various embodiments, the ACD 130 may prioritize and route calls to an agent based on the required skill level. Skills-based routing may be a rule-based set of instructions that the ACD 130 uses to handle calls. Depending on the embodiment, skills-based routing may be implemented by the ACD 130, or by the ACD 130 interacting with a computer-telephone integrated ("CTI") server 145.

In various embodiments, the CTI server 145 may be incorporated in the call center architecture 100 to control and/or coordinate other components of the architecture 100. Specifically, the CTI server 145 may interact with the ACD 130 to coordinate call processing. Thus, in particular embodiments, the CTI server 145 may control routing of calls from the ACD 130 to the various agent workstations and/or may provide data to other components processing the calls. The CTI server 145 may also provide call reporting functionality based on data collected during calls.

The second type of signaling information that may be provided with an inbound call is the calling telephone number, often referred to as automatic number identification or "ANI." In particular embodiments, the ACD 130 and/or CTI server 145 may use the ANI of an incoming call to retrieve caller information from a data store 175 and provide the data to an agent's workstation computer 160a-160c over facilities 168 along with routing the call to the agent's workstation phone 161a-161c. Further, in particular embodiments, the ANI may also be used to ascertain a party's status (e.g., a "Gold Level" customer warranting premium service) and/or to facilitate the ACD 130 routing the call to a select group of agents. Depending on the embodiment, the data store 175 may include one or more databases storing different information such as, for example, records of caller information. Further, the data store 175 may be integrated with the CTI server 145, the ACD 130, or segregated as a standalone medium or media.

In various embodiments, the ACD 130 may place a call in a queue if there are no suitable agents available, and/or it may route the call to an interactive voice response server ("IVR") 135 to play voice prompts. In particular embodiments, these prompts may be in a menu type structure and the IVR 135 may collect and analyze responses from the party in the form of dual-tone multiple frequency ("DTMF") tones and/or speech. In addition, the IVR 135 may be used to further identify the purpose of the call, such as, for example, prompting the party to enter account information or otherwise obtain information used to service the call. Further, in particular embodiments, the IVR 135 may interact with other components, such as the CTI server 145 or the data store 175, to retrieve or provide information for processing the call. In other configurations, the IVR 135 may be used to only provide announcements.

Depending on the embodiment, the interaction between the ACD 130, IVR 135, CTI server 145, agent computers 160a-160c, as well as other components, may involve using a local area network ("LAN") 170. However, other configurations are possible, such as, but not limited to, using a wide area network, wireless network, router, bridge, direct point-to-point links, etc.

In particular embodiments, when an agent is interacting with a called or calling party, the agent may use his workstation computer 160b to further interact with other enterprise computing systems, such as, for example, a customer relationship management ("CRM") server 140. A CRM server 140 may be used to integrate information from various enterprise business systems to facilitate the agent servicing the call. In addition, the CRM server 140 may provide a variety of applications.

In addition to receiving inbound communications, including, for example, voice calls, emails, text messages, and facsimiles, the call center may also originate communications to a called party, referred to herein as "outbound" communications. In some embodiments, a call center may employ a dialer 150, such as a predictive dialer, to originate outbound calls on behalf of an agent at a rate designed to meet various criteria. Similar to the other components within the call center architecture 100, depending on the embodiment, the dialer 150 may comprise one or more software modules executing on a processing device hardware platform.

In various embodiments, the dialer 150 is typically configured to dial a list of telephone numbers to initiate outbound calls, which can be accomplished by instructing the ACD 130 to originate the calls. Thus, in some embodiments, the ACD 130 may include functionality for originating calls, and if so, this functionality may be referred to as a private automatic branch exchange ("PBX" or "PABX"). In other embodiments (not shown), the dialer 150 may directly interface with voice trunks using facilities 116c, 116d, 116e to the PSTN 115 and/or Internet providers 123b for originating calls. After the calls are originated, a transfer operation by the ACD 130 may connect the call with an agent, or place the call in a queue for an available agent. In the latter case, announcements or music may be provided to the party. In various embodiments, the dialer 150 may make use of one or more algorithms to determine how and when to dial a list of numbers so as to minimize the likelihood of a called party being placed in a queue while maintaining target agent utilization.

Another server that may be employed in the call center architecture 100 is a workforce management ("WFM") server 155. In various embodiments, this server 155 maintains information to generate agents' schedules to effectively handle inbound/outbound calls. For instance, in particular embodiments, the WFM server 155 may maintain historical call volume information for call campaigns and may forecast expected call volume to predict the number of agents needed to handle the call volume at a defined service level. The WFM server 155 may then apply information about available agents to generate a work roster of agents. In other words, the WFM server 155 may schedule agents for their work shifts according to the anticipated needs of the call campaigns.

Finally, in various embodiments, the call center architecture 100 may include one or more other processing devices 156 to perform various functions. For example, in one particular embodiment, the call center architecture 100 includes a processing device 156 to serve as a quality assurance system that records communications fielded by agents and/or allows managers to monitor communications to ensure these communications are being handled correctly.

Although the above components are referred to as a "server," each may be also referred to in the art as a "computing device," "unit" or "system." A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the ACD 130, IVR 135, CRM server 140, CTI server 145, dialer 150 and/or WFM server 155 may be combined into a single hardware platform executing one or more software modules. In addition, the call center architecture 100 may be provided as a hosted solution, where the call processing functionality is provided as a communication service (a so-called "communication-as-a-service" or "CaaS") to a call center operator. Thus, there is no requirement that the servers identified above actually be located or controlled by a call center operator. Furthermore, in particular instances, a call center operator may have on-premise capabilities as described above and may use a hosted cloud solution to acquire further capacity and/or capabilities when needed. For example, a call center operator may acquire additional trunks via a CaaS to address an increased demand in receiving inbound calls and/or placing outbound calls.

In addition, depending on the embodiment, the agent positions may be co-located in a single physical call center or multiple physical call centers. The agents may be remotely located from the other components of the call center, and may also be remotely located from each other, sometimes referred to as a "virtual call center." In particular instances, a virtual call center may describe a scenario in which agents work at home, using their own computers and telephones as workstations. In some configurations, a single physical location of the call center may not be readily identifiable. For instance, this may occur when the call processing functions are provided as a service in a hosted cloud computing environment and the agents positions are in their individual residences.

In some contexts, a "contact center" is understood to be a center that receives various forms of communication, including email communications. Hence, the center to which the user communicates may be referred to herein as a "contact center" as opposed to a "call center."

Using Predictive Dialers for Outbound Call Origination

Call centers may originate outbound calls for various reasons. A list of individuals may be called, for example, to notify them that an upcoming payment is due. In another embodiment, prospective customers may be contacted for telemarketing solicitations. Such outbound calls have a probability that they will not be answered by the right party. For example, the dialed telephone number may be disconnected or busy; the call may not be answered; or may be answered by a fax or answering machine. These are some examples of failing to achieve a "right party connect" ("RPC"). The likelihood of achieving a RPC for an outbound call may vary, in part, according to when the call is originated.

To maximize agent productivity, call centers may employ predictive dialers reducing the agents' waiting time. Predictive dialers may attempt to minimize agent waiting time by predicting the likelihood that an agent in a pool of agents will be available to connect with one of several outbound calls originated by the dialer and predicting the likelihood that a call will achieve a RPC. Thus, the predictive dialer may originate a number of calls even though no agents are currently available with the expectation that one of the agents in the pool will be available and that not all of the calls will achieve a RPC.

The likelihood of an outbound call connecting with the right party may vary on the time of day and day of week when the individual is called. For example, the individual may have a work schedule such that they can be expected to be available (or unavailable) at their home telephone number depending on their work schedule. The likelihood of reaching a RPC for a number may be very low between 2-4 p.m., but may be higher between 6-8 p.m. (All times are local with respect to the called party.) Thus, when a predictive dialer originates calls between 2-4 p.m., a larger number of call originations may be required before a RPC occurs relative to when the predictive dialer attempts calls originating between 6-8 p.m.

A simplistic solution would be for the predictive dialer to initiate as many calls as possible, and disconnect any answered calls if an agent is unavailable. However, this mode of operation may result in the called party rushing to answer their phone only to then have the predictive dialer disconnect the call if an agent is unavailable. In some instances, federal regulations limit the percentage of such abandoned calls for an outbound call campaign, as this type of outcome may be considered a nuisance by the called parties.

Thus, the pacing algorithm must accurately determine how many calls to originate so as to minimize agent waiting time and minimize abandoned calls. Depending on the embodiment, the pacing algorithm may monitor various inputs, including: the number of agents logged-in to the call center, the number of agents assigned to the outbound campaign, and each agent's individual status. The pacing algorithm may account for how many agents are allotted for handling calls, how many agents are engaged in after-call work activities (and thus are unavailable to accept a call), and how many are available for a call, in order to determine when and how many calls to originate. The number of available agents actually logged in at a call center can vary, due to varying start times during a day, agents being on break, etc. Further complicating matters is that agents may be grouped into teams having certain skills, so that a given agent may be only able to handle certain types of calls. For example, an agent trained to participate in a particular telemarketing campaign may not be qualified to handle calls for a different telemarketing campaign.

Predictive dialer manufacturers may define different pacing algorithms or parameters that can be set by a call center administrator to adjust the pacing of outbound call origination. Early pacing algorithms were static, e.g., the algorithm depended in large part on the application of an algorithm for monitoring resources (e.g., available agents), calculating statistics based thereon, and predicting when to make the next call. That is, the algorithms were static in the sense that the call center's current operational status was monitored and the basic pacing algorithm did not take into account historical factors affecting the probability of a RPC for a given call. For example, early algorithms did not account for the past history of call attempts to that telephone number in determining the probability of a call attempt reaching a RPC.

Pacing algorithms have become more sophisticated by measuring and monitoring changing conditions and taking into account additional factors, including aspects depending on time or history. For references purposes, such pacing algorithms are referred to herein as dynamic pacing algorithms. Such algorithms may take into account time related factors. For example, the likelihood of a call achieving a RPC may depend on the time of day when that call originates or on the number of prior call attempts of that telephone number during the shift. Pacing algorithms may even "learn" or adjust the algorithm based on past history. Thus, the number of originating calls originated for an agent (or group of agents) by a predictive dialer may vary over the course of a shift or the campaign.

Another factor impacting the likelihood of an originating call reaching a RPC involves prior processing of the telephone number by the predictive dialer. In some embodiments, a list of telephone numbers is prepared for processing for that day's shift. In one embodiment, the list is processed by the predictive dialer in a serial manner at the beginning of a shift and starting from the beginning of the list. As the predictive dialer processes the list, and as outbound calls are connected, the disposition of each call is recorded by the agent handling the call. If a RPC occurs, then that telephone number may be marked as such in the list, so that the number will not be redialed later in the campaign. Generally, once a telephone number encounters a RPC, that telephone number is not redialed again during the campaign, let alone during the same shift. Once a RPC is achieved for a telephone number, the number may be skipped over when reprocessing the list.

However, a dialed number on the outbound list resulting in a no-answer condition is noted by the predictive dialer and may be redialed at another time later in the shift (or on another day). A number resulting in a busy may be redialed as well, but relatively sooner compared to a no-answer condition. For reference purposes herein, when a telephone number is initially dialed, it is referred to herein as an 'initially dialed' number. A number on the list that is dialed again later during the same shift is referred to as a 're-dialed' number. Many of the numbers dialed later in the day may be redialed numbers, as the initially dialed numbers encountering a RPC are skipped. As the shift progresses, many of the telephone numbers in a list may be redialed more than once. There is a higher likelihood of a no-answer condition that may be predicted based on the past dialing history for that number.

The pacing algorithm on the predictive dialer may be programmed to detect the decreasing likelihood of reaching a RPC for an outbound call and account for this by increasing the number of outbound calls originated. In other words, the predictive dialer may originate more outbound calls to maintain the same level of agent utilization during the shift.

While the above example illustrates a dialing list that represents the telephone numbers to be processed for a given shift, the list can be processed over multiple shifts on the same day (such as a day shift and an evening shift), leading to similar results as described above. Thus, it is possible for calls in one shift (e.g., evening shift) to have a decreased likelihood of a RPC relative to calls made during a previous shift (e.g., day shift).

In another example, the dialing can be defined for processing over a week (or some other time period). Telephone numbers that do not encounter a RPC may be reprocessed and redialed later during the week. In such an example, the telephone numbers at the beginning of the list and dialed at the end of the week (e.g., later in the campaign) may represent those numbers with a lower likelihood of an RPC. That is, the telephone numbers at the beginning of the list and dialed at the end of the week may include telephone numbers that did not previously encounter a RPC. Thus, by the end of the week, a larger number of calls may need to be originated by the predictive dialer at the beginning of the shift so as to maintain agent utilization. In summary, the predictive dialer can adapt to various circumstances for adjusting the number of call originations and the adaption may occur over a shift, a week, or over a campaign.

However, the number of calls that the predictive dialer can originate is limited in some manner. Specifically, there is a maximum number of contemporaneous calls that can be originated by the predictive dialer. This number may be limited by various factors including how many trunks are available for outbound calls. Although a call center may be allocated a fixed number of outbound trunks to use for a campaign, some call centers may be operated in a "blended" manner, wherein trunks may be dynamically assigned for outbound or inbound call handling as the need arises. Thus, a call center may normally operate using, for example, a maximum of 100 outbound trunks, but if a large surge of incoming calls is experienced, then the number of available outbound trunks may temporarily decrease as some of the outbound trunks are reassigned as inbound trunks. This is another circumstance where the number of available outbound trunks may decrease leading to a trunk deficiency condition for the predictive dialer.

In some embodiments, these trunks may be conventional time division multiplexed ("TDM") communication facilities. In the context of other embodiments such as those employing voice over IP that may not use multiplexed TDM facilities per se, the "trunks" may be other forms of hardware resource limitations. In other embodiments, the resource limitation could be another form of a hardware oriented resource limitation, such as a maximum number of hardware ports, memory, processing capability, or hardware-related licenses for hardware resources.

On the other hand, the resource limitation could be a virtual or logical resource limitation. In some embodiments, the resource limitation could be bandwidth limiting the number of simultaneous calls that can be pending. In other embodiments, the resource limitation could be a software-oriented resource limitation, such as a maximum number of processes for handling calls or a fixed number of licenses, such as line licenses or other software modules processing calls or labels allocated for identifying calls. The above examples of resource limitations associated with the number of calls that can be originated by the predictive dialer are referred to herein as trunk-related resource limitations. Other forms of resources than identified above may constitute trunk-related resource limitations that preclude calls being originated by the predictive dialer.

Typically, once the predictive dialer reaches this hard limit on trunk-related resources no further calls can be made. For purposes of illustration, the following discussion presumes that the trunk-related resources are actual trunks, but as noted, the concepts disclosed herein are not limited to actual trunks.

An example can illustrate how trunking limitations can result in a decrease of agent productivity when the predictive dialer has to increase the number of outbound calls in order to obtain a RPC. Assume a call center has a maximum of 110 trunks allocated for outbound calls and serves 80 agents. Assume that all the agents are engaged with calls, so that 80 of the 110 trunks are utilized for active calls. This results in 30 trunks being available for use by the predictive dialer to originate calls. Assume that at any given time, the predictive dialer is originating calls in anticipation of 5 agents being available within a time window. At the beginning of the list processing, the likelihood of any given outbound call reaching a RPC may be relatively high. Assume that the predictive dialer may have to originate 5 calls in order to have one call available for an agent. Since the predictive dialer is originating calls for 5 agents at any one time, this requires 25 trunks to be available to the predictive dialer. As there are 30 trunks available, there are still 5 trunks unused. However, when telephone numbers on the list are being redialed, the likelihood of a RPC typically declines and the predictive dialer may have to originate 8 calls per agent in order to achieve one RPC. This would require 5*8=40 calls to be originated, requiring 40 trunks. In this case, there is a trunk deficiency of 10 trunks since there are only 30 trunks available.

The maximum number of available trunks may become a factor impacting agent efficiency. That is, once the predictive dialer reaches the maximum number of trunks agent utilization may be expected to decrease. This situation may not be readily apparent to call center management. In fact, conventional agent productivity reporting mechanisms typically calculate an average performance metric for each agent.

The average performance metric for an agent may cover a month, a week, or a day. However, the average agent performance metric may not readily suggest a trunk-related resource deficiency condition. First, the circumstances causing degradation of the agent's performance during a portion of the agent's shift are not readily identifiable because they are included in the overall average. For example, a drop in performance for a given day relative to other days can be attributed to various other factors. Second, even if time-based agent performance measurements are obtained during a shift (e.g., hourly calculations), a drop of the overall agents' performance during a portion of their shift can be attributable to other factors, such as the decreasing probability of a RPC affecting all the agents. Although the decrease in the RPC is a source contributing to the cause of the problem, the direct cause is a trunk resource limitation.

Thus, pinpointing the cause of a temporary decline in agents' productivity can be difficult to detect. It is only with hindsight that the trunk resource deficiency, once identified, may be pinpointed as the proper cause of a decline in agent productivity. Failing to detect the proper cause of the decline can lead to a call center administrator pursuing ineffective corrective actions. For example, call center administrators may attempt to address the decline in agent productivity by adjusting the pacing algorithm parameters to attempt even more outbound calls. However, this is unlikely to be effective since the number of outbound call originations by the predictive dialer is already capped by the available trunks, and attempting to originate more calls will be unsuccessful.

Figure 2:
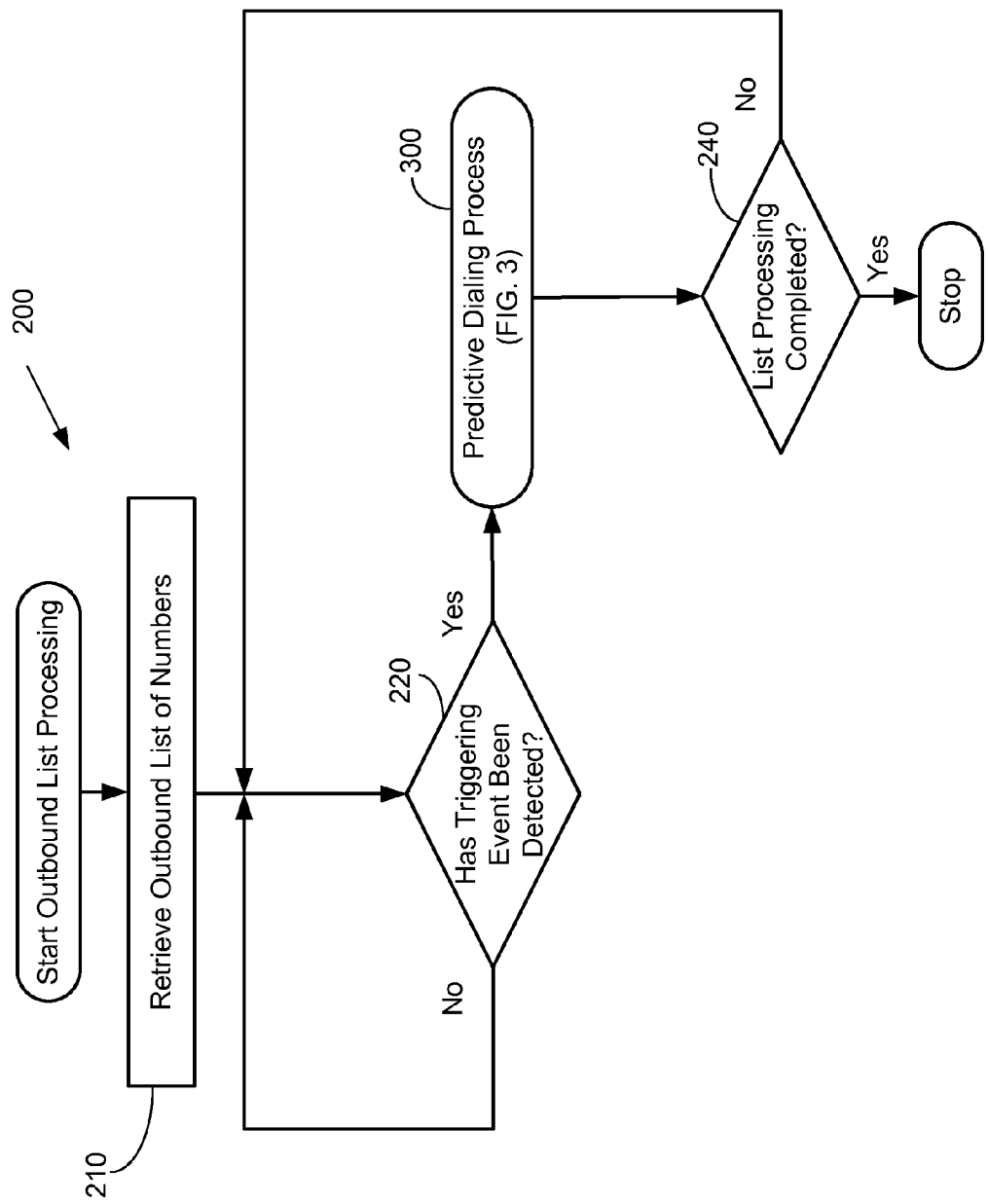
FIGS. 2 and 3 disclose one embodiment of a process flow for providing notification of trunk-related resource limitations encountered when originating outbound calls using a predictive dialer.

In many instances, a process for detecting and reporting a trunk-related resource limitation to a call center administrator will allow effective identification of the root cause of the problem causing declining agent productivity. An embodiment of such a process is summarized in FIGS. 2 and 3. The process 200 in FIG. 2 illustrates one embodiment of processing a dialing list for outbound calls according to the concepts disclosed herein. The process begins in operation 210 with the predictive dialer retrieving and loading the dialing list. The list may be associated with a particular outbound calling campaign, software application, and a team or group of agents. The list may be created by a call center supervisor prior to the beginning of a shift using various software tools, and then loaded at the beginning of the shift for processing. The list typically includes other information as well, such as call disposition information, which may be generated as the list is processed. In particular instances, call disposition or status information is used by the pacing algorithm during processing to ascertain the likelihood of obtaining a RPC.

In other embodiments, a dialing list for a shift is not explicitly prepared. Rather, the predictive dialer may periodically retrieve batches of telephone numbers from a data store as needed. However, for illustration purposes, it is assumed that the list is prepared for a given group of agents for dialing at the beginning of a shift. Other processes may be performed by the predictive dialer contemporaneously with operation 210 for initiating list processing at the beginning of a shift.

At operation 220 the predictive dialer determines if a triggering event has occurred which would cause initiation of one or more outbound calls. A number of factors may be considered as to whether dialing should occur, including analyzing the disposition status of the agents, pending and active calls, or other resources. The triggering event can vary according to the pacing algorithm.

Figure 3:
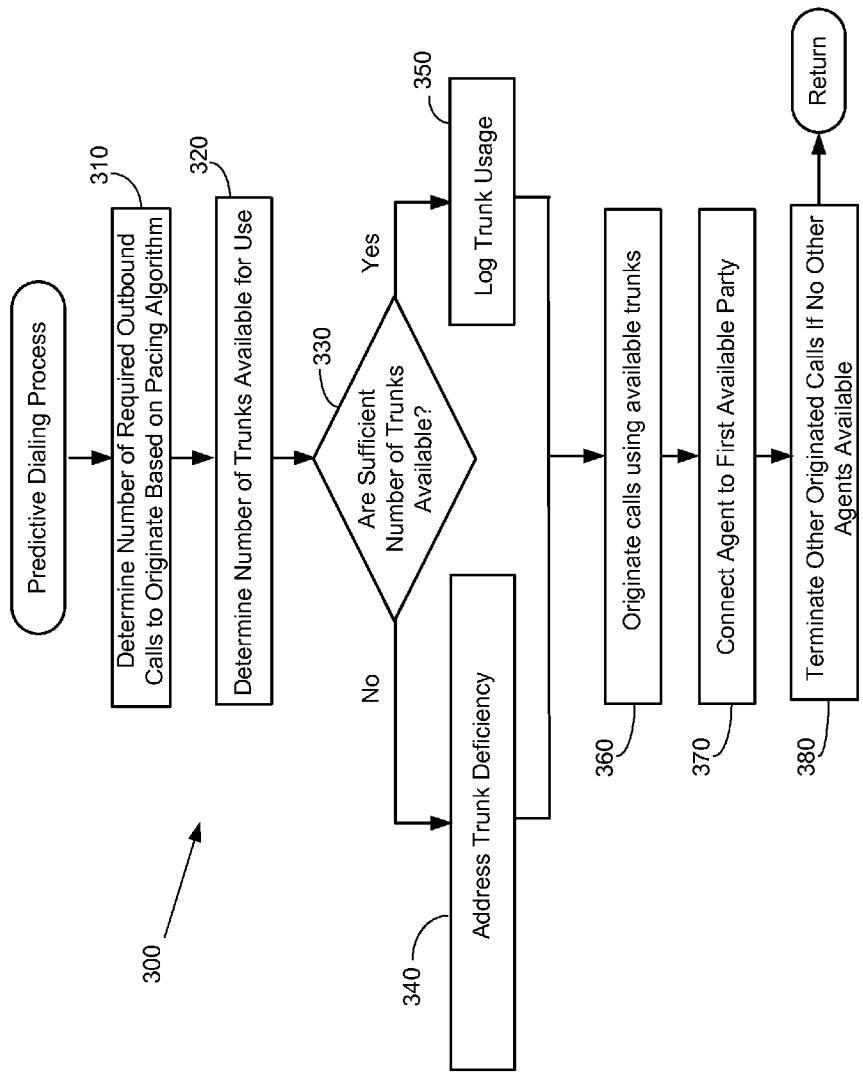

Assuming a triggering event is detected and one or more calls should be originated, then the predictive dialing process of operation 300 is performed. FIG. 3, which will be discussed shortly, provides additional details of the predictive dialing process. Upon completion of the process of the predictive dialing algorithm 300, a determination is made in operation 240 whether all the numbers in the list have been processed. Note that "processed" can have various meanings, and may not be limited to only determining whether a prior dialing attempt occurred for that number. For example, a number on the list may have been dialed earlier, but encountered a busy signal. In this case, it may be appropriate to redial the number. In another case, the number may have been dialed previously resulting in reaching an answering machine. In this case, additional redial attempts may be precluded for a defined time period. Both of the above examples illustrate how list processing can be determined as completed or not in operation 240.

Consequently, the list processing flow 200 shown in FIG. 2 illustrates one embodiment where numbers on the list are dialed and redialed as the process 200 loops. Thus, the predictive dialer may loop through the list several times as it redials numbers. Accordingly, as numbers are redialed, the likelihood of a RPC may change and the pacing algorithm may take this into account in determining the number of calls to originate for an agent.

The predictive dialer process 300 is shown in FIG. 3. Various pacing algorithms known in the art may be employed in operation 310 to predict how many outbound calls should be originated. This determination may vary according to the particular pacing algorithm. Specifically, the pacing algorithm may account for various factors in determining how many outbound calls should be originated such as the number of available agents, average call handling time, queue size, etc. However, regardless of how the number of calls to originate is determined, each outbound call requires a trunk-related resource.

In operation 320, the predictive dialer determines how many trunks are available for use in originating calls. In operation 330, a determination is made whether there are sufficient trunks available to initiate the required number of calls. If the determination is made in operation 330 that an insufficient number of trunks is available, then operation continues in operation 340, where the trunk-related resource deficiency is addressed by taking one or more actions.

For instance, in particular embodiments, the trunk-related resource deficiency is addressed by recording the deficiency in a log file, along with the required and available number of trunks. Depending on the embodiment, other information, such as the time, software application, number of agents, etc., may be recorded for purposes of generating a report. Further, in particular embodiments, the trunk-related deficiency data may be used to generate real-time notification to a call center administrator. This notification can be in the form of an icon displayed on a performance dashboard, a text message notification to a call center administrator, etc.

While in other embodiments, the trunk-related resource deficiency is addressed by obtaining additional resources from some other source such as a hosted cloud service provider. For example, the call center may contract with a hosted cloud service provider to provide the call center with additional resources when needed. Thus, in this instance, once the determination is made that an insufficient number of trunks is available, the call center obtains the additional number of trunks needed from the hosted cloud service provider to address the deficiency. As the result, the predictive dialer now has the number of outbound trunks needed to place the required outbound calls.

Still, in other embodiments, the trunk-related resource deficiency is addressed by decreasing the number of available agents and correspondingly decreasing the number of outbound calls required to be made by the predictive dialer. For instance, one or more of the available agents may be provided with a break or re-assigned to only handle inbound calls (e.g., one or more of the available outbound agents may be re-assigned as inbound agents) so that they are no longer available to field outbound calls. As a result, the pacing algorithm may then re-calculate the number of required outbound calls to be originated to a number that can be made using the available trunks.

It is noted that although the specification has exclusively discussed identifying trunk-related resource deficiencies, various embodiments of the invention may involve identifying and addressing trunk-related resource surpluses instead of/or in addition to deficiencies. For instance, the pacing algorithm may calculate a number of required outbound calls to originate based on the number of available agents that does not make use of all of the trunks that are currently available. Therefore, in this instance, if the trunks that are currently available and are not being used are dedicated outbound trunks, these trunks are considered surplus resources that are setting idle. Thus, the call center may want to take action to address the surplus. For example, the call center may want to shift the surplus trunks from handling outbound calls to handling inbound calls and/or shift inbound agents to outbound agents so that a greater number of outbound calls can be originated and accordingly make use of the surplus trunks. The same types of actions can be made with respect to other types of trunk-related resource surpluses such as, for instance, processing capacity and/or bandwidth.

Returning now to FIG. 3, if the number of available trunks is sufficient to handle the desired number of outbound calls in operation 330, then in operation 350 the usage data can also be recorded, even though there is no deficiency condition.

In operation 360, the calls are originated using the available number of trunks. As mentioned, in particular embodiments, the available number of trunks may have been increased to address the determined trunk deficiency. Regardless, once the limit of trunks is reached, then no more outbound calls can be originated. In operation 370, the agent is connected to the first available party of the calls that were originated for that agent. Next, in operation 380, the other calls may be terminated if there are no other agents that are available. However, it is possible that when the calls are originated in operation 360 that another agent becomes available. This newly available agent could then "piggyback" and be connected to one of these originated calls. Those skilled in the art will recognize that a variety of process flows could be defined for FIG. 3. In other embodiments, the limiting resource may not be actual TDM trunks, but other forms of trunk-related resources.

As mentioned, in particular embodiments, the logging data is used to generated a report or notification in order to inform the call center administrator of the trunk resource deficiency. In one embodiment, an outbound trunk deficiency report is generated that informs the call center administrator that trunk resources have limited operation of the predictive dialer. In this particular embodiment, the trunk-related resources limiting the number of calls are actual trunks available. However, the logging and reporting of deficient resources could be other forms of trunk-related resources.

Thus, when the predictive dialer reports a trunk-related deficiency condition, the predictive dialer "knows" that it is not operating at the maximum efficiency that it is capable of. That is, the predictive dialer is cognizant of the number of available and allotted trunks and is designed to recognize conditions that can cause a potential decrease in agent productivity, and to record the condition in the trunk-resource deficiency log and/or provide a report. This avoids the call center administrator from having to rely on other forms of resource reports, which may not directly indicate the cause of the problem.

Although a call center administrator may apply, for example, a rule of thumb of how many additional trunks need to be allocated to a group of agents in order to facilitate predictive dialing, the call center administrator may not be cognizant of the nuances of the pacing algorithm and how the pacing algorithm's trunk requirements can change based on specific times or the dialing history of a list. Thus, as a result, the call center administrator may easily overlook the cause of the problem. However, various embodiments of the invention address this shortcoming by facilitating the predictive dialer to detect and record trunk-related resource deficiencies.

Further, predictive dialer manufacturers typically focus on defining and refining their proprietary pacing algorithms so the predictive dialer is designed to function within the confines of the allocated trunk resources. In many instances, these predictive dialer manufacturers may presume that other call center system reporting tools are sufficient to inform administrators of trunk-related resource deficiencies. However, again, various embodiments of the invention address this shortcoming by facilitating the predictive dialer to detect and record trunk-related resource deficiencies.

Figure 4:
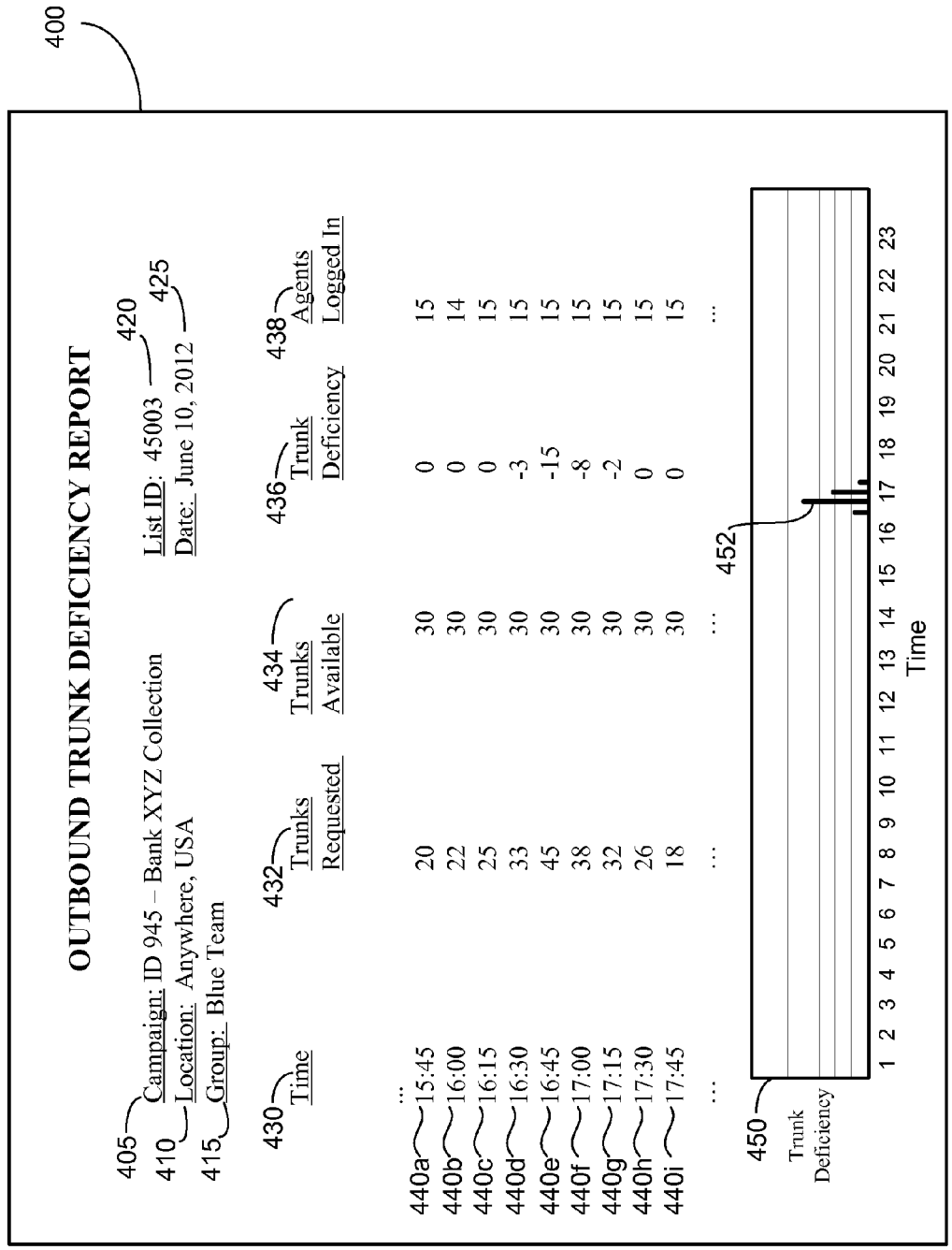
FIG. 4 is one embodiment of a report providing information regarding resource limitations encountered during an outbound campaign.

Turning to FIG. 4, one embodiment of a trunk deficiency report 400 is shown that may be presented to a call center administrator via a computer screen, printout, web browser, and/or transmitted as input to a computing device running a worksheet program, mobile application, or other program, which is then processed for display. In this embodiment, the report shows information about the particular campaign 405 for which the predictive dialer is initiating calls. The call center location 410 may also be indicated, as well as the agent group 415 or team involved. The report may identify the dialing list 420 being processed, and the date 425 on which the outbound calls were originated. Depending on the embodiment, various formats can be defined for reporting the resource deficiency and other information may be included as well.

In this format, various columns 430-438 are defined. These include a "time" column 430 shown in a 24 hour format, a "trunks requested" column 432, a "trunks available" column 434, a "trunk deficiency" column 436, and an "agents logged in" column 438. In this embodiment, data values are recorded in 15 minute increments, as shown in rows 440a-440i. From the report, it is observed there are a sufficient number of trunks available to meet the number of requested trunks in rows 440a-440c, and hence the trunk deficiency for rows 440a-440c is zero. However, at 16:30, which is the fourth row 440d, a trunk deficiency of −3 is indicated. FIG. 4 also shows that the trunk deficiency increases to −15 at 16:45, down to −8 at 17:00, and to −2 at 17:15.

A graphical indication in the format of a chart 450 may be provided on the report, and the deficiencies 452 are shown as bars on the chart 450. This allows a ready indication of when and how severe is the resource deficiency. This information may be used by the call center administrator to correlate a decrease in overall call center performance, which may be indicated by other reports covering the same times.

Further, as previously mentioned, in particular embodiments, the data logged can be used to also provide real time notification to call center personnel. For instance, in particular embodiments, the notification could be provided using a dashboard to display real time performance parameters reflecting the operational status of the call center. This notification could be in various forms, such as an icon indicating the existence of a resource deficiency or a real-time graph. The call center administrator could use the dashboard to then access the log data in the form of a report to learn of specific details of the trunk-related resource deficiency condition. The icon could also present an index value indicating the relative severity of the condition. This could be expressed in various forms, and could be defined by the call center administrator to trigger an indication only when a threshold is exceeded. For example, only when more than 5% of the total number of requested trunks is unavailable would the icon then be presented. Other forms of notification may be used in other embodiments, including, for example, transmitting an email, text message, or reporting the status to another reporting system.

Using Historical Data Recorded for Past Trunk-Related Resource Deficiencies

Figure 5:
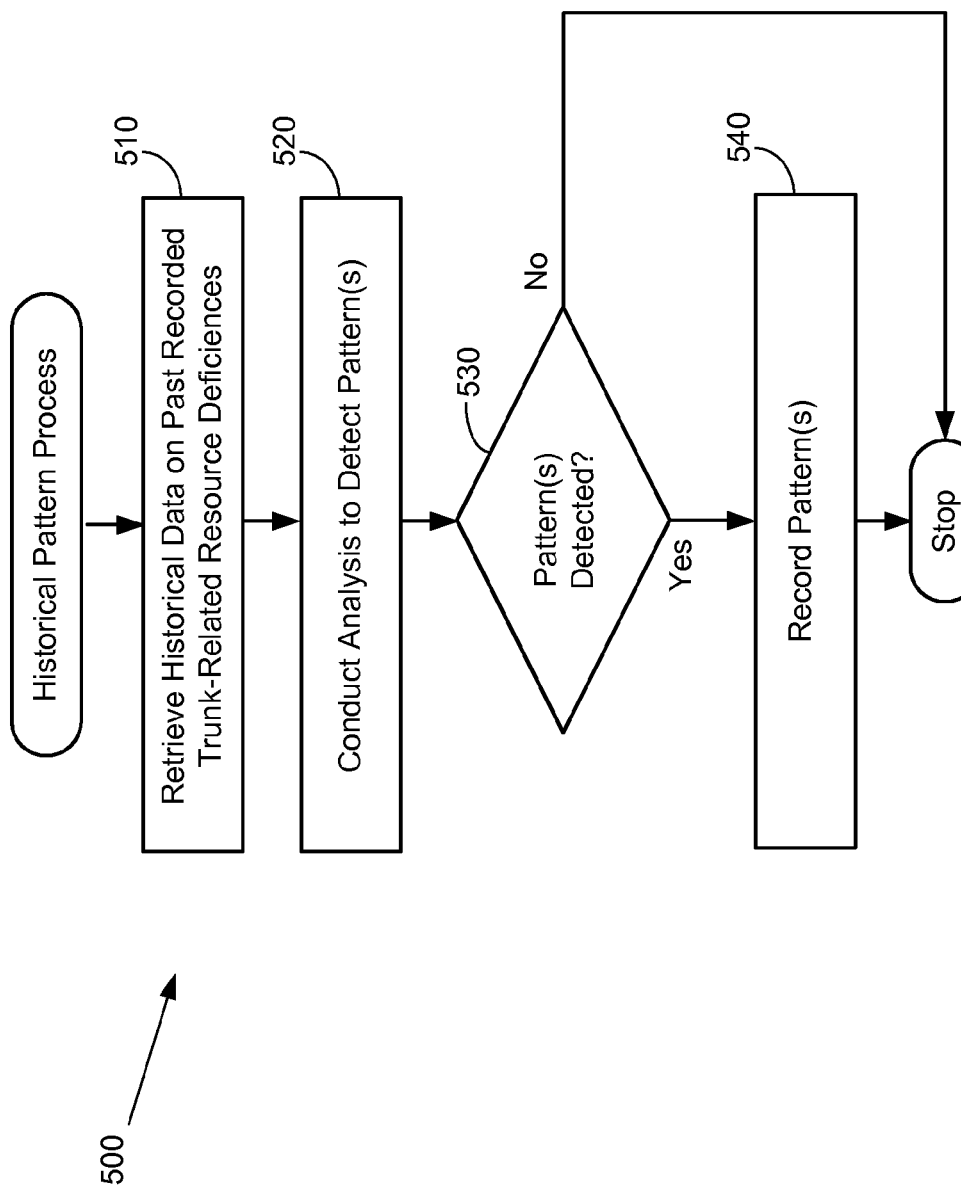
FIG. 5 discloses one embodiment of a process flow for analyzing historical data for past recorded trunk-related resource deficiencies.

Finally, in particular embodiments, the data logged for past trunk-related resource deficiencies can be analyzed to identify patterns of reoccurring time periods in which trunk-related resource deficiencies historically occur. The identification of such patterns can assist a call center in better planning to attempt to minimize such deficiencies in the future. Accordingly, a process 500 for performing such an analysis according to one embodiment is shown in FIG. 5.

The process begins in operation 510 with some component of the call center architecture 100 retrieving data logged for trunk-related resource deficiencies that were recorded over some past period of time. For instance, in particular embodiments, the component may be the CTI server 145 or WFM server 155 previously described with respect to FIG. 1.

The past period of time can vary depending on the circumstances and the historical data set the call center wishes to use for the analysis. For example, the call center may be planning to conduct an outbound campaign in the near future for debt collection purposes. Therefore, in this example, the call center may wish to have a historical data set representative of one or more past campaigns conducted for debt collection purposes. In addition, the call center may wish to retrieve data logged over a particular period of time to ensure the historical data set includes an adequate sample size of deficiencies for conducting the analysis.

Once the historical data set has been retrieved, the process continues with the component of the call center conducting the analysis on the historical data set to detect patterns within the data set in operation 520. For instance, in particular embodiments, the analysis involves identifying reoccurring periods of time in which trunk-related resource deficiencies have historically occurred. If human analysis is involved, then the data may be graphically displayed to facilitate analysis by a call center administrator.

Figure 6:
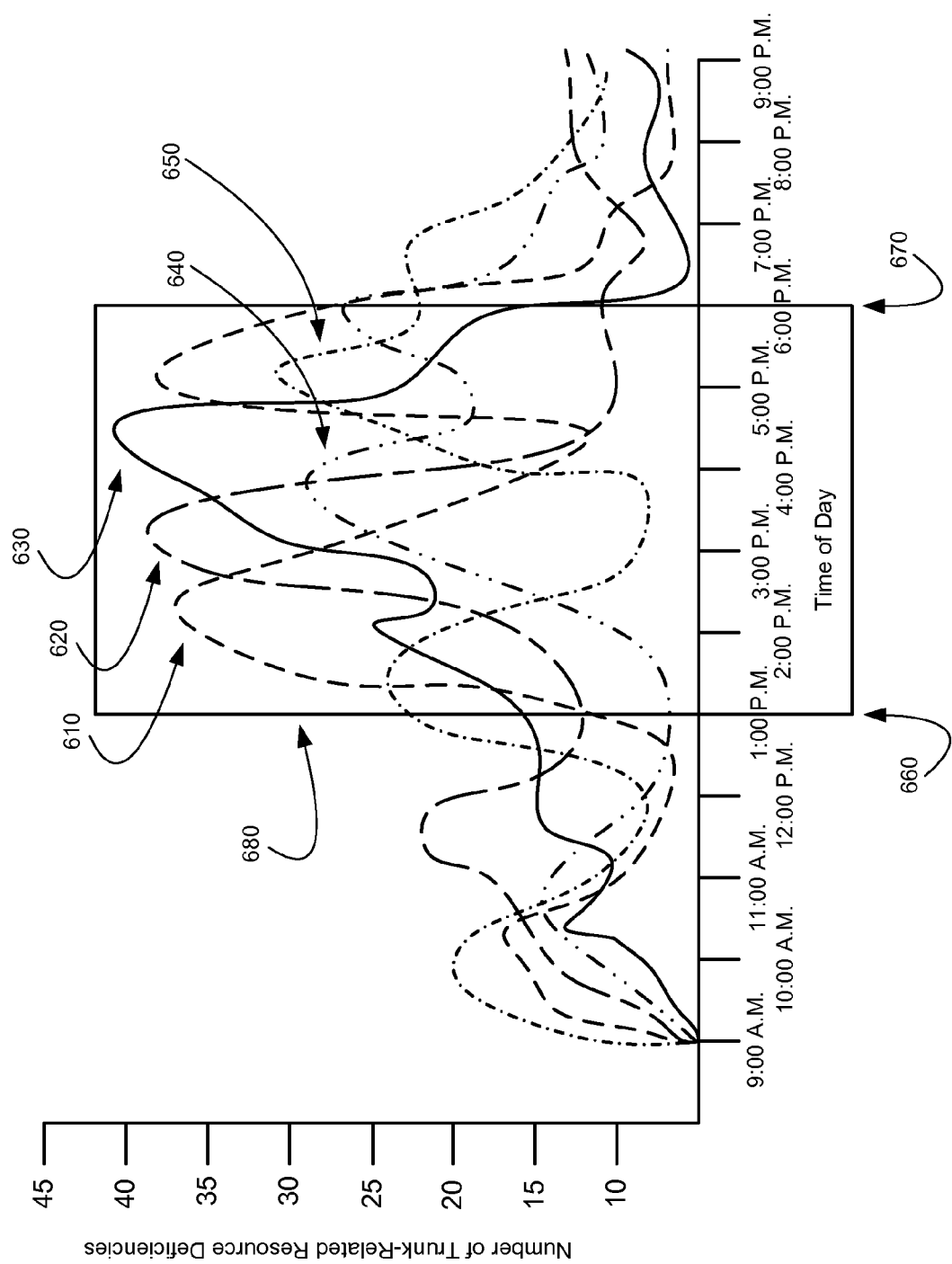
FIG. 6 provides a graphical representation of trunk-related resource deficiencies recorded over a past time period.

For example, turning to FIG. 6, a graphical representation is shown of trunk-related resource deficiencies recorded at various times of the day over a past time period. In this instance, the time period involves a past work week comprising five working days (e.g., Monday, Tuesday, Wednesday, Thursday, and Friday) in which a working day started at 9:00 a.m. and ended at 9:00 p.m. Accordingly, each line shown on the graph represents a particular working day and depicts the number of trunk-related resource deficiencies that occurred at various times during the working day. Thus, lines 610, 620, 630, 640, and 650 represent Monday, Tuesday, Wednesday, Thursday, and Friday, respectfully, for the past work week graphically represented in FIG. 6.

Looking at the graphical representation, one can see that the highest number of trunk-related deficiencies occurred for each working day between the hours of 1:00 p.m. 660 and 6:00 p.m. 670 as shown in the box 680. Therefore, the component analyzing the data may conclude from the data logged for this past work week that a pattern (e.g., trend) exists in which a high number of trunk-related resource deficiencies tend to occur between the hours of 1:00 p.m. and 6:00 p.m. for a given working day of the call center.

Accordingly, returning to FIG. 5, once the component has completed the analysis, the component determines in operation 530 whether any patterns were detected in the analysis conducted on the data logged for trunk-related resource deficiencies recorded over the past period of time. If so, then the component records the recognized pattern(s) in operation 540 and the process ends.

At this point, the recorded pattern(s) can be used as information to help the call center plan for future activities to attempt to avoid the occurrence of trunk-related resource deficiencies. For instance, returning to the example in which the call center is planning to conduct an outbound campaign in the near future for debt collection purposes, the call center may provide information on the pattern as input to the WFM server 155 as the server generates a work schedule for the outbound campaign. Thus, in this example, the WFM server may take into account the high number of trunk-related resource deficiencies that tend to occur between the hours of 1:00 p.m. and 6:00 p.m. by generating, for instance, a work schedule that includes a higher number of agents than usual scheduled to take breaks (e.g., lunch and/or dinner) during this time period of each working day. Alternatively, agent training could be scheduled for these times. As a result, fewer trunk-related resource deficiencies should occur during this time period each working day since the pacing algorithm being used by the predictive dialer will have fewer available agents to have to account for in determining the number of outbound calls that should be originated by the predictive dialer during this time period. \

In other instances, the call center may use the information on such patterns to identify occasions when the center may wish to obtain additional resources to help minimize trunk-related resource occurrences. For example, if the trunk-related resource deficiencies are typically the result of not having enough trunks to originate the required outbound calls, then the call center may acquire additional outbound trunks during these identified time periods so that they will be available to use to originate the required outbound calls. Likewise, if the trunk-related resource deficiencies are typically the result of processing capacity, then the call center may acquire additional processing capabilities from some third-party provider during these identified time periods. Those of ordinary skill in the art can envision other uses for the information on such recognized patterns in light of this disclosure.

Although the above is illustrated in the context of analyzing historical data in non-real time, the components analyzing the data may also do so in real time. Thus, if a resource deficiency exceeding a threshold is detected, agents may be scheduled in real time for a break or training. In other embodiments, additional resources may be made available in real time. For example, in some embodiments it may be possible to convert certain trunk resources from inbound calls to outbound calls, thus making available more trunk resources for outbound calls. In summary, information indicating the existence of a resource deficiency can be used in real time or non-real time, and may be used to trigger either adding additional resources or reducing the demand for those resources.

Finally, it is noted that a similar analysis can be performed to recognize reoccurring time periods in which trunk-related resource surpluses historically occur. Again, depending on the circumstances, the call center may make use of the information on such patterns to help the call center plan for future activities to attempt to avoid occurrences of such surpluses. For example, if a large number of surplus trunk-related resources are observed during certain times of the day, additional agents can be scheduled to increase utilization of these trunk-related resources. Alternatively, the resources may be able to be reallocated to other purposes. For example, a blended contact center may reallocate some of the outbound trunks for handling inbound calls.

Exemplary Processing Device Architecture

Figure 7:
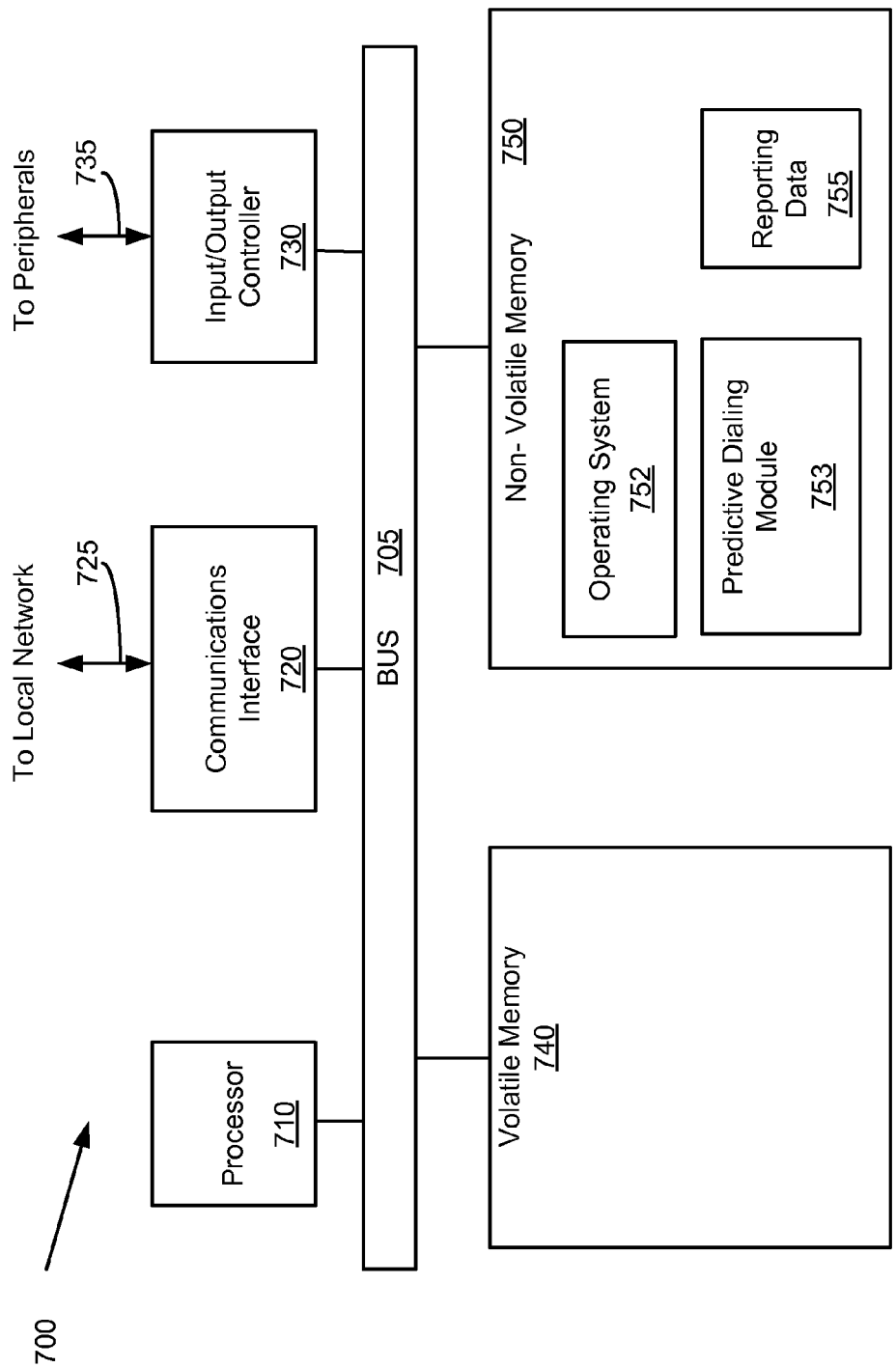
FIG. 7 is an exemplary schematic diagram of a processing device used in one embodiment to practice the technologies disclosed herein.

As discussed in conjunction with FIG. 1, the call center architecture 100 may comprise various components that may comprise a processing system. FIG. 7 provides an exemplary schematic of a processing device in a processing system 700, which could represent individually or in combination the dialer 150, such as a predictive dialer, or other component to practice the technologies disclosed. In general, the term "processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 7, the processing system 700 may include one or more processors 510 that may communicate with other elements within the processing system 700 via a bus 705. The processor 710 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 700 may also include one or more communications interfaces 720 for communicating data via the local network 170 with various external devices, such as other components of FIG. 1. In other embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 730 may also communicate with one or more input devices or peripherals using an interface 735, such as, but not limited to: a keyboard, a mouse, a touch screen/display input, microphone, pointing device, etc. The input/output controller 730 may also communicate with output devices or peripherals, such as displays, printers, speakers, headsets, banner displays, etc.

The processor 710 may be configured to execute instructions stored in volatile memory 740, non-volatile memory 750, or other forms of computer readable storage media accessible to the processor 710. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 750 may store program code and data, which also may be loaded into the volatile memory 740 at execution time. Specifically, the non-volatile memory 750 may store one or more predictive dialing program modules 753 and/or operating system code 752 containing instructions for performing the process and/or functions associated with the technologies disclosed herein. The predictive dialing program module 753 may also access, generate, or store reporting data 755, such as the aforementioned trunk-related deficiency data, in the non-volatile memory 750, as well as in the volatile memory 740. The volatile memory and/or non-volatile memory may be used to store other information including, but not limited to: records, applications, programs, scripts, source code, object code, byte code, compiled code, interpreted code, machine code, executable instructions, or the like. These may be executed or processed by, for example, processor 710. These may form a part of, or may interact with, the predictive dialer program module 753.

The technologies described herein may be implemented in various ways, including as computer program products comprising memory storing instructions causing a processor to perform the operations associated with the above technologies. The computer program product may comprise a non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

The detection of a trunk-related resource deficiency condition encountered by a predictive dialer when processing a dialing list may result in a decline of agent productivity. Detection of the cause of the trunk-related deficiency may not be readily apparent by a call center administrator, and if aware, may lead to unproductive attempts to remedy the drop in agent productivity by ineffective actions. The notification and/or reporting of a trunk-related deficiency condition encountered by the predictive dialer can provide an effective tool to the call center administrator to reconfigure allocated resources for an outbound campaign.

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for identifying a trunk-related resource deficiency condition in a call center, the method comprising:
   originating outbound calls by a predictive dialer based on a list of telephone numbers;
   identifying the trunk-related resource deficiency condition by a computer processor while the predictive dialer is originating the outbound calls based on the list of telephone numbers, the trunk-related resource deficiency condition comprising pacing the predictive dialer to attempt to control waiting time for one or more available outbound agents and control abandoned calls that requires originating a number of outbound calls by the predictive dialer using a number of required trunk-related resources equal to or exceeding a number of available trunk-related resources; and
   recording trunk-related resource deficiency data indicating a quantified value of the trunk-related resource deficiency condition.

2. The method of claim 1 further comprising allocating a number of cloud-based, trunk-related resources from a hosted cloud computing system in response to identifying the trunk-related resource deficiency condition, wherein the number of cloud-based, trunk-related resources at least equals a difference between the number of required trunk-related resources and the number of available trunk-related resources.

3. The method of claim 1 further comprising allocating at least one of the one or more available outbound agents as an inbound agent to handle one or more inbound calls received by the call center in response to identifying the trunk-related resource deficiency condition.

4. The method of claim 1 further comprising:
   conducting an analysis on the trunk-related resource deficiency data and historical trunk-related resource deficiency data for one or more other trunk-related resource deficiency conditions identified over a previous time period;
   identifying from the analysis at least one pattern indicating a reoccurring time period in which trunk-related resource deficiency conditions historically occur; and
   providing the at least one pattern to a workforce management system, wherein the workforce management system makes use of the at least one pattern in scheduling outbound agents during the reoccurring time period for future work shifts.

5. The method of claim 1, wherein the trunk-related resources comprise one or more of outbound trunks, hardware ports, memory, computer processing capability, hardware-related licenses, software-related licenses, and bandwidth.

6. The method of claim 1, wherein the computer processor resides in the predictive dialer.

7. The method of claim 1, wherein the predictive dialer employs a pacing algorithm to determine the pacing, and the number of outbound calls to be originated by the predictive dialer is determined based in part on a likelihood of an outbound call achieving a right party connect.

8. The method of claim 1 further comprising providing a resource deficiency notification for display to a call center administrator in response to identifying the trunk-related resource deficiency condition.

9. A non-transitory, computer-readable medium for storing computer-executable instructions that when executed by a predictive dialer causes the predictive dialer to:
   originate outbound calls for a list of telephone numbers;
   identify a trunk-related resource deficiency condition while originating the outbound calls based on the list of telephone numbers, the trunk-related resource deficiency condition comprising pacing the predictive dialer to attempt to control waiting time for one or more available outbound agents and control abandoned calls that requires originating a number of outbound calls by the predictive dialer using a number of required trunk-related resources equal to or exceeding a number of available trunk-related resources; and
   record trunk-related resource deficiency data indicating a quantified value of the trunk-related resource deficiency condition.

10. The non-transitory, computer-readable medium of claim 9, wherein the computer-executable instructions when executed by the predictive dialer further cause the predictive dialer to allocate a number of cloud-based, trunk-related resources from a hosted cloud computing system in response to identifying the trunk-related resource deficiency condition, the number of cloud-based, trunk-related resources being at least equal to a difference between the number of required trunk-related resources and the number of available trunk-related resources.

11. The non-transitory, computer-readable medium of claim 9, wherein the computer-executable instructions when executed by the predictive dialer further cause the predictive dialer to allocate at least one of the one or more available outbound agents as an inbound agent to handle one or more inbound calls received by a call center in response to identifying the trunk-related resource deficiency condition.

12. The non-transitory, computer-readable medium of claim 9, wherein the computer-executable instructions when executed by the predictive dialer further cause the predictive dialer to:
conduct an analysis on the trunk-related resource deficiency data and historical trunk-related resource deficiency data for one or more other trunk-related resource deficiency conditions identified over a previous time period;
identify from the analysis at least one pattern indicating a reoccurring time period in which trunk-related resource deficiency conditions historically occur; and
provide the at least one pattern to a workforce management system, wherein the workforce management system makes use of the at least one pattern in scheduling outbound agents during the reoccurring time period for future work shifts.

13. The non-transitory, computer-readable medium of claim 9, wherein the trunk-related resources comprise one or more of outbound trunks, hardware ports, memory, computer processing capability, hardware-related licenses, software-related licenses, and bandwidth.

14. The non-transitory, computer-readable medium of claim 9, wherein the computer-executable instructions when executed by the predictive dialer further cause the predictive dialer to employ a pacing algorithm to determine the pacing, and the number of outbound calls to be originated by the predictive dialer is determined based in part on a likelihood of an outbound call achieving a right party connect.

15. The non-transitory, computer-readable medium of claim 9, wherein the computer-executable instructions when executed by the predictive dialer further cause the predictive dialer to provide a resource deficiency notification for display to a call center administrator in response to identifying the trunk-related resource deficiency condition.

16. A system for identifying a trunk-related resource deficiency condition in a call center, the system comprising:
a predictive dialer configured to originate outbound calls for a list of telephone numbers; and
a computer processor configured to:
identify the trunk-related resource deficiency condition while the predictive dialer is originating the outbound calls based on the list of telephone numbers, the trunk-related resource deficiency condition comprising pacing the predictive dialer to attempt to control waiting time for one or more available outbound agents and control abandoned calls that requires originating a number of outbound calls by the predictive dialer using a number of required trunk-related resources equal to or exceeding a number of available trunk-related resources; and
record trunk-related resource deficiency data indicating a quantified value of the trunk-related resource deficiency condition.

17. The system of claim 16, wherein the computer processor is further configured to allocate a number of cloud-based, trunk-related resources from a hosted cloud computing system in response to identifying the trunk-related resource deficiency condition, wherein the number of cloud-based, trunk-related resources at least equals a difference between the number of required trunk-related resources and the number of available trunk-related resources.

18. The system of claim 16, wherein the computer processor is further configured to allocate at least one of the one or more available outbound agents as an inbound agent to handle one or more inbound calls received by the call center in response to identifying the trunk-related resource deficiency condition.

19. The system of claim 16, wherein the computer processor is further configured to:
conduct an analysis on the trunk-related resource deficiency data and historical trunk-related resource deficiency data for one or more other trunk-related resource deficiency conditions identified over a previous time period;
identify from the analysis at least one pattern indicating a reoccurring time period in which trunk-related resource deficiency conditions historically occur; and
provide the at least one pattern to a workforce management system, wherein the workforce management system makes use of the at least one pattern in scheduling outbound agents during the reoccurring time period for future work shifts.

20. The system of claim 16, wherein the trunk-related resources comprise one or more of outbound trunks, hardware ports, memory, computer processing capability, hardware-related licenses, software-related licenses, and bandwidth.

21. The system of claim 16, wherein the computer processor resides in the predictive dialer.

22. The system of claim 16, wherein the computer processor is further configured to employ a pacing algorithm to determine the pacing, and the number of outbound calls to be originated by the predictive dialer is determined based in part on a likelihood of an outbound call achieving a right party connect.

23. The system of claim 16, wherein the computer processor is further configured to provide a resource deficiency notification for display to a call center administrator in response to identifying the trunk-related resource deficiency condition.

\* \* \* \* \*